US008086478B2

(12) United States Patent
Chen et al.

(10) Patent No.: US 8,086,478 B2
(45) Date of Patent: Dec. 27, 2011

(54) METHOD AND SYSTEM FOR MANAGING CONFLICTING CALENDAR ENTRIES

(75) Inventors: Yen-Fu Chen, Austin, TX (US); Fabian F. Morgan, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1222 days.

(21) Appl. No.: 11/692,988

(22) Filed: Mar. 29, 2007

(65) Prior Publication Data

US 2008/0243582 A1  Oct. 2, 2008

(51) Int. Cl.
*G06Q 10/00* (2006.01)
(52) U.S. Cl. ............... 705/7.19; 705/7.18; 705/7.24
(58) Field of Classification Search ............ 705/7.18, 705/7.19, 7.24
See application file for complete search history.

(56) References Cited

U.S. PATENT DOCUMENTS

| | | | |
|---|---|---|---|
| 4,819,191 A | 4/1989 | Scully et al. | |
| 4,866,611 A | 9/1989 | Cree et al. | |
| 5,070,470 A | 12/1991 | Scully et al. | |
| 5,627,764 A | 5/1997 | Schutzman et al. | |
| 5,774,867 A | 6/1998 | Fitzpatrick et al. | |
| 5,790,974 A | 8/1998 | Tognazzini | |
| 6,567,807 B1* | 5/2003 | Robles et al. ........................ | 1/1 |
| 6,571,281 B1 | 5/2003 | Nickerson | |
| 6,856,962 B2 | 2/2005 | Yonemitsu | |
| 7,519,663 B1* | 4/2009 | Bostick et al. ................ | 709/204 |
| 2001/0014866 A1* | 8/2001 | Conmy et al. ..................... | 705/9 |
| 2002/0194048 A1 | 12/2002 | Levinson | |
| 2003/0103415 A1* | 6/2003 | Bates et al. ..................... | 368/28 |
| 2003/0149606 A1* | 8/2003 | Cragun et al. .................... | 705/8 |
| 2003/0204848 A1* | 10/2003 | Cheng et al. .................... | 725/58 |

(Continued)

OTHER PUBLICATIONS

Salamat, Hooman (1999). The development of an automated meeting scheduler. M.Comp.Sc. dissertation, Concordia University (Canada), Canada. Retrieved Aug. 9, 2011, from ABI/INFORM Global.(Publication No. AAT MQ39117).*

(Continued)

*Primary Examiner* — Beth V Boswell
*Assistant Examiner* — Stephanie Zagarella
(74) *Attorney, Agent, or Firm* — Schmeiser, Olsen & Watts; Mark Vallone (57) ABSTRACT

The present invention enables a user to schedule meetings and detect scheduling conflicts. A system user such as an employee schedules a meeting. The time and date of the meeting is stored in an account for that user. When the same user schedules another meeting, that meeting is detected and compared with any previously and scheduled and stored meetings for that user. If there is a conflict between the presently scheduled meeting and any previously scheduled meeting, then the present invention alerts the user and gives the user the opportunity to select the new meeting for that time or to retain the currently scheduled meeting. The present invention can also store and track the unscheduled meetings. In the event the scheduled meeting is postponed or canceled, the user can be notified and given the opportunity to schedule and attend a previously declined meeting that was scheduled for that same time.

7 Claims, 7 Drawing Sheets

U.S. PATENT DOCUMENTS

| | | | |
|---|---|---|---|
| 2004/0088362 A1* | 5/2004 | Curbow et al. | 709/207 |
| 2005/0256754 A1* | 11/2005 | Nastacio | 705/8 |
| 2006/0047557 A1* | 3/2006 | Bieselin et al. | 705/9 |
| 2006/0200374 A1* | 9/2006 | Nelken | 705/9 |
| 2007/0198316 A1* | 8/2007 | Boland et al. | 705/8 |
| 2007/0239509 A1* | 10/2007 | Kaminsky et al. | 705/9 |
| 2007/0294120 A1* | 12/2007 | Berstis et al. | 705/9 |
| 2008/0082606 A1* | 4/2008 | Gupta et al. | 709/204 |
| 2008/0091504 A1* | 4/2008 | Lyle et al. | 705/9 |
| 2008/0243582 A1 | 10/2008 | Chen et al. | |
| 2008/0255919 A1 | 10/2008 | Gorder | |
| 2009/0083106 A1 | 3/2009 | Bhogal et al. | |
| 2009/0083112 A1 | 3/2009 | Bhogal et al. | |

OTHER PUBLICATIONS

Dawson et al., Internet Calendaring and Scheduling Core Specification (iCalendar), Network Working Group RFC 2445, Nov. 1998, available at 222.faqs.org/rfcs/rfc2445.html.

USPTO Office Action (Mail Date Jul. 21, 2010) for U.S. Appl. No. 11/859,927, filed Sep. 24, 2007; Confirmation No. 5670.

USPTO Final Office Action (Mail Date Nov. 10, 2010) for U.S. Appl. No. 11/859,927, filed Sep. 24, 2007; Confirmation No. 5670.

USPTO Office Action (Mail Date May 12, 2010) for U.S. Appl. No. 11/860,114, filed Sep. 24, 2007; Confirmation No. 6028.

USPTO Final Office Action (Mail Date Oct. 28, 2010) for U.S. Appl. No. 11/860,114, filed Sep. 24, 2007; Confirmation No. 6028.

* cited by examiner

METHOD AND SYSTEM FOR MANAGING CONFLICTING CALENDAR ENTRIES

FIELD OF THE INVENTION

This invention relates to a method and system for scheduling meetings, and in particular a method and system for tracking meeting schedules, detecting meeting schedule conflicts and alerting a user of meeting schedule conflicts, detecting meeting postponements or cancellation and alerting the user of such conflicts, postponements and meeting cancellations. With this invention, a user has the opportunity modify the user's meeting schedule in response to detected meeting schedule changes.

BACKGROUND OF THE INVENTION

Data processing systems may be provided with an electronic calendar application. An electronic calendar application may allow persons, called users, to maintain and coordinate, on the data processing system, individual on-line schedules called electronic calendars and to schedule meetings among users maintaining such electronic calendars. To schedule such a meeting, a user may input desired meeting attendees, such as a requester and a target with whom the requester wishes to meet. The user may also input one or more proposed dates, times and durations for the proposed meeting. The electronic calendar application accesses the electronic calendars of the proposed attendees, the requester and the target, and determines whether they are available to attend the meeting on the proposed date and time for the proposed duration.

Many times, employees receive multiple calendar meeting invitations for the same time period, or for overlapping time periods, and this causes the employee to have to choose which meeting or portions of meetings they are going to attend. However, there are still deficiencies with regard to scheduling and attending meetings, especially meetings that have been canceled, postponed or rescheduled. Consider the following scenario. A user receives calendar invitation for meeting B, but meeting A is already scheduled at that same time slot (or overlapping time slot). The user declines meeting B, because he/she can only attend one meeting at a time, and has decided meeting A is more "important". Meeting A is rescheduled before the scheduled time for the meeting to begin. Now, user has free time to attend meeting B, but because he/she initially declined it, he/she has lost the meeting information and/or has forgotten there was another meeting at this time, and consequently misses it.

Conventional methods and systems have attempted to electronically address the general concept of scheduling meetings. U.S. Pat. No. 5,774,867 issued to Fitzpatrick et al. describes a method and apparatus are provided for camping on an electronic calendar. This invention determines, in response to an input of a date, a time and a duration of a proposed meeting between a meeting requester and a target, that a conflicting event appears on the target's electronic calendar. This invention also monitors the target's electronic calendar to detect the removal of the conflicting event, and schedules a meeting between the requester and the target on their electronic calendars in response to the detection of the removal of the conflicting event U.S. Pat. No. 6,856,962 issued to Yonemitsu describes a schedule management system includes a schedule data table which stores the schedule data including an identifier of a schedule owner, the time zone, activity and the state of the schedule. A schedule data registration unit accepts a schedule reservation request, determines whether the schedule registration is permitted or not based on the schedule state of the schedule data existing in the schedule data table and the definition data, and when the schedule registration is permitted, and registers the reservation schedule in the schedule data table. A schedule data approval unit accepts a request from the schedule owner for approving/disapproving the schedule and rewrites the schedule state of the corresponding schedule data in the schedule data table. A schedule display unit accepts a schedule display request, determines whether the existing schedule is displayed or not based on the schedule state of the schedule data existing in the schedule data table and the definition data, and displays only the schedule data determined for display.

Although other efforts have attempted to address scheduling concerns, there remains a need for a software enhancement to calendaring tools to handle this situation.

SUMMARY OF THE INVENTION

This invention comprises enhancements to calendaring tools to provide globally unique identifiers (GUIDs) such that any calendar meeting can be uniquely tracked. In addition, this invention comprises the ability for the calendar tool to either automatically provide tracking capabilities whenever a meeting conflict is discovered, or to manually prompt the user if the tracking capabilities should be activated upon detection of the conflict.

The method of the present invention works by first detecting a conflict in the meeting schedule that would be caused by acceptance of a meeting (which is currently being done today). Upon this detection, the software would either manually prompt the user or look up a user preference setting to see if the user wants to keep track of the other meeting(s) that were declined because of the conflict. If the user chooses yes, or if the preference setting is yes, then the software would monitor the calendar entries such that if the accepted meeting was rescheduled, the software would see if any of the declined meetings were still available in the same time slot, and if so, would prompt the user if he/she wanted to attend it. If the declined meeting was rescheduled, and the rescheduled time conflicted with another meeting, then the algorithm would recurse on this conflict.

DETAILED DESCRIPTION OF THE INVENTION

Figure 1:
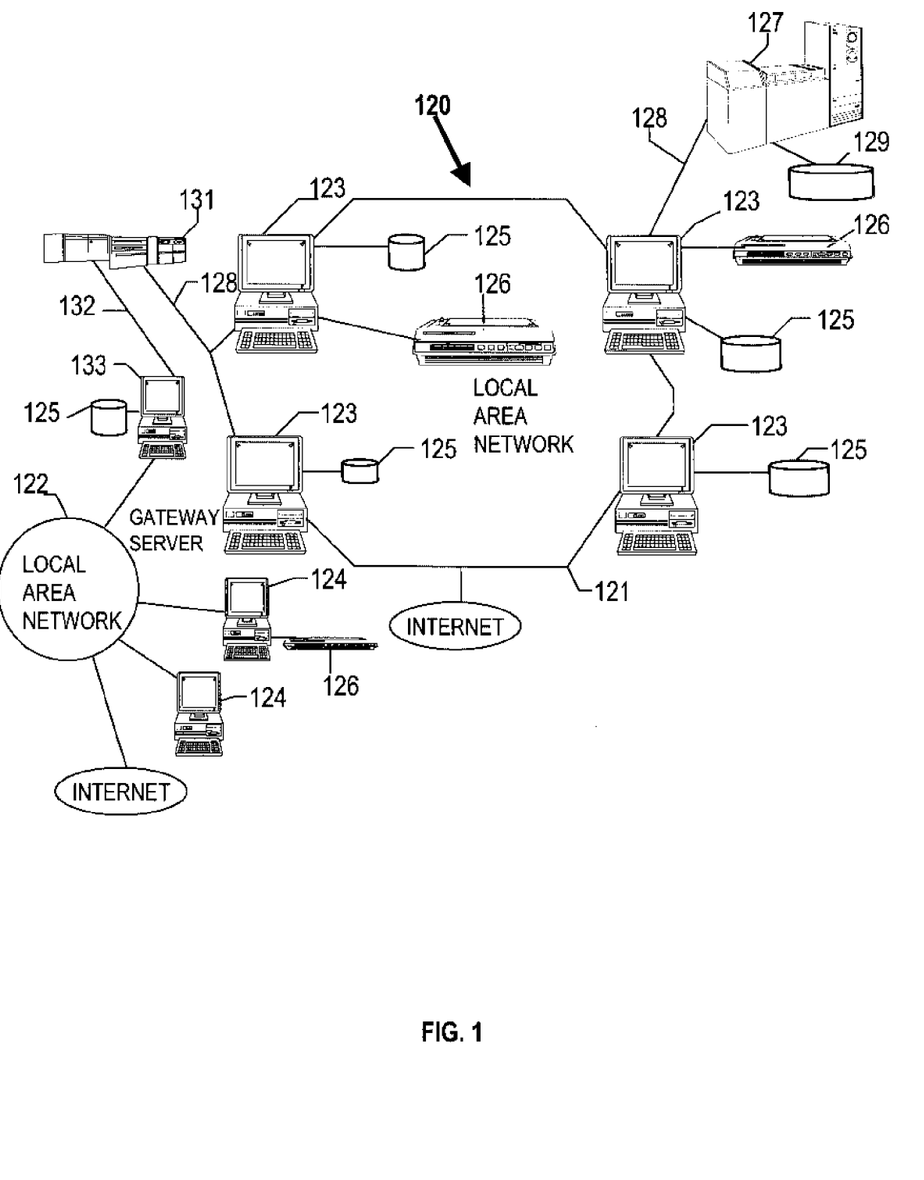
FIG. 1 is a distributed data processing system that can be used in the implementation of the present invention.

With reference to FIG. 1, there is shown a pictorial representation of a distributed data processing system, which may be used to implement the method and apparatus of the present invention. As may be seen, distributed data processing system 120 may include a plurality of networks, such as Local Area Networks (LAN) 121 and 122, each of which preferably includes a plurality of individual computers 123 and 124, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer may be coupled to a storage device 125 and/or a printer/output device 126. One or more such storage devices 125 may be utilized, in accordance with the method of the present invention, to store the various data objects or documents which may be periodically accessed and processed by a user within distributed data processing system 120, in accordance with the method and system of the present invention. In a manner well known in the prior art, each such data processing procedure or document may be stored within a storage device 125 which is associated with a Resource Manager or Library Service, which is responsible for maintaining and updating all resource objects associated therewith.

Still referring to FIG. 1, it may be seen that distributed data processing system 120 may also include multiple mainframe computers, such as mainframe computer 127, which may be preferably coupled to Local Area Network (LAN) 121 by means of communications link 128. Mainframe computer 127 may also be coupled to a storage device 129 which may serve as remote storage for Local Area Network (LAN) 121. A second Local Area Network (LAN) 122 may be coupled to Local Area Network (LAN) 21 via communications controller 31 and communications link 132 to a gateway server 133. Gateway server 133 is preferably an individual computer or Intelligent Work Station (IWS), which serves to link Local Area Network (LAN) 122 to Local Area Network (LAN) 21. As discussed above with respect to Local Area Network (LAN) 122 and Local Area Network (LAN) 121, a plurality of data processing procedures or documents may be stored within storage device 129 and controlled by mainframe computer 127, as Resource Manager or Library Service for the data processing procedures and documents thus stored. Of course, those skilled in the art will appreciate that mainframe computer 127 may be located a great geographical distance from Local Area Network (LAN) 121 and similarly Local Area Network (LAN) 121 may be located a substantial distance from Local Area Network (LAN) 124.

Figure 2:
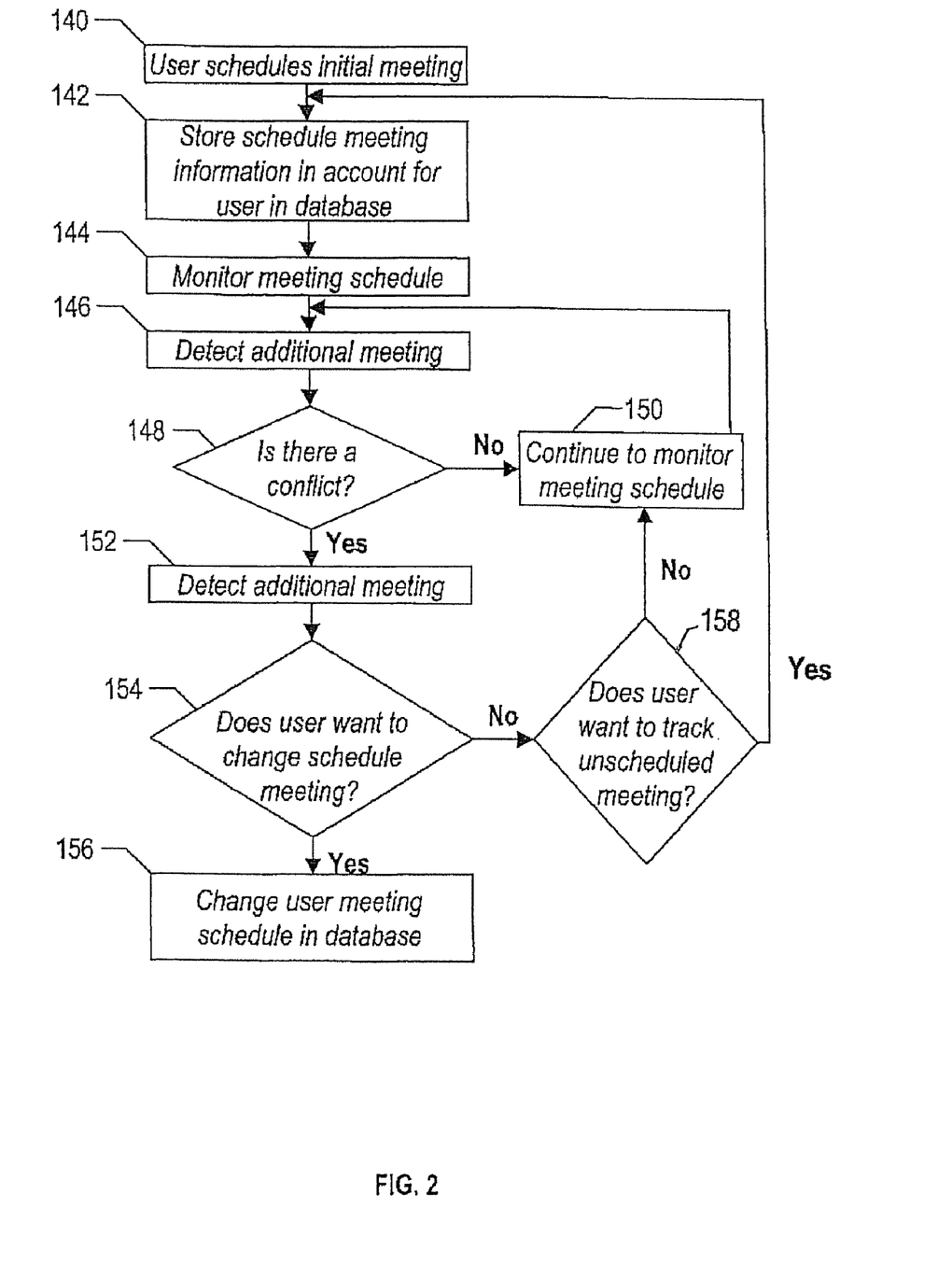
FIG. 2 is a flow diagram of the general steps in the implementation of the present invention.

Referring to FIG. 2, in step 140, a user schedules a meeting. The information about this meeting including the date, time and location of the meeting is stored in a database in an account for that particular user in step 142. At this point, the method goes into a monitor mode in step 144. In this monitoring state, the user's meeting schedule is monitored for any activities related to scheduling or canceling meetings. This monitoring process can be a periodic check of the database file/account of the user. Each time a check is performed that last status can be recorded. At the completion of the check, the last two statuses can be compared to determine if there have been any changes in the meeting schedule.

If the user schedules a new meeting, this new meeting is recorded in the same manner as other scheduled meetings. At this point, step 146 detects the newly scheduled meeting. This detection could be the result of changes found between the last two status checks of the monitor. When an additional meeting is detected, the next step 148 is to determine whether there is conflict between the newly scheduled meeting and a previously scheduled meeting. An alternate approach is to perform this activity at the time the user accepts or schedules the meeting. In that approach, at the time the user schedules the new meeting, a check could be done to determine if that time slot is available. If there is not a conflict, the method continues to monitor the user's meeting schedule in step 150 and returns to step 142 where this new meeting is added to the user's meeting schedule if it has not yet been added. Returning to step 148, if there is already scheduled meeting at that time slot, the method would detect a conflict and alert the user in step 152. The user has the opportunity to decide which meeting they want to attend in step 154. The user can decide to change meetings in step 156 and attend the newly added meeting. At this point, the user is also prompted in step 158 to decide whether they want to track the meeting that they will not attend. This meeting is viewed as an unscheduled meeting. This tracking step 158 is done regardless of which meeting the user chooses to attend.

Figure 3:
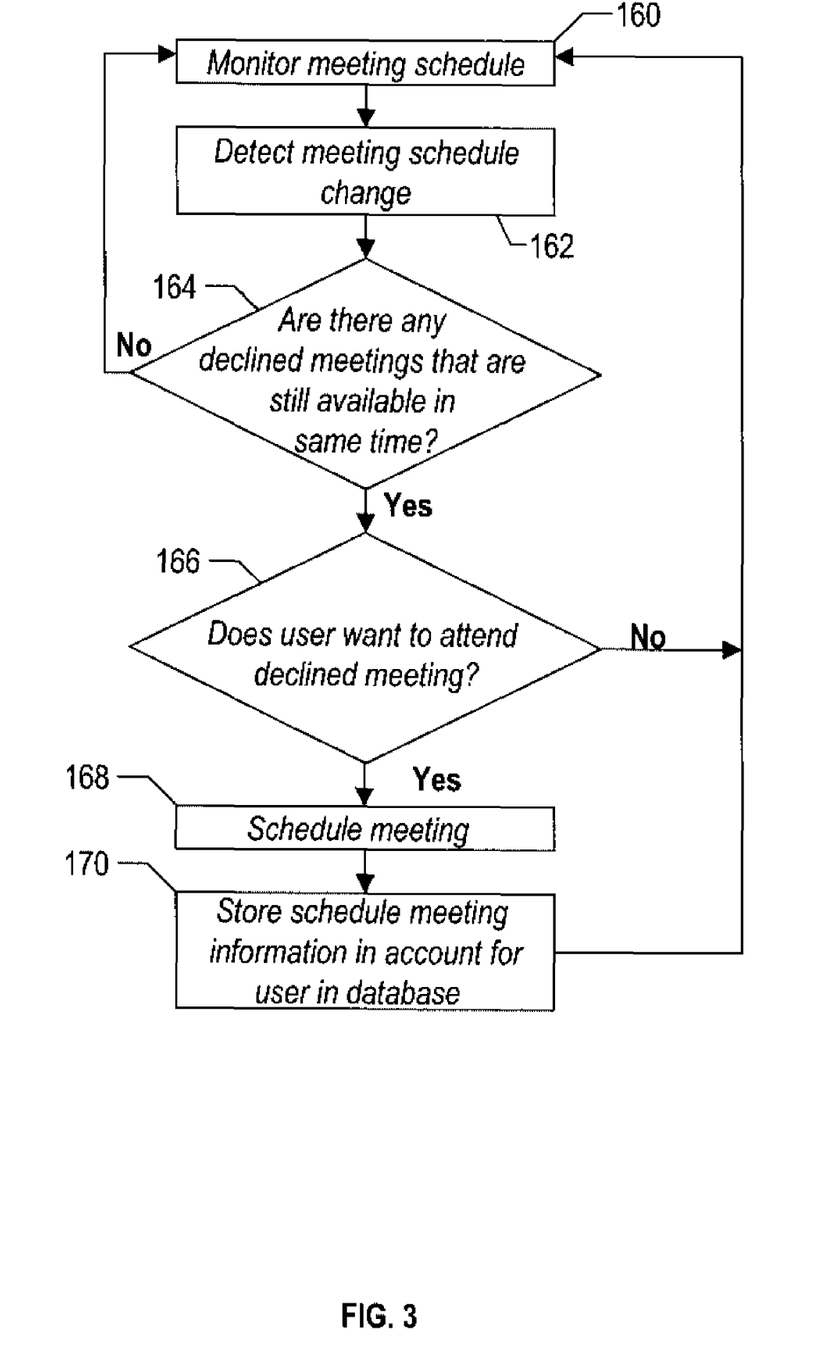
FIG. 3 is a flow diagram of the rescheduling steps in the implementation of the present invention.

In some instances, scheduled meetings will get postponed and rescheduled or canceled. When these changes occur, that time occupied by that postponed or canceled meeting becomes open. If there was previously a scheduling conflict for that time slot with another meeting, the user may now want to attend the unscheduled meeting. FIG. 3 is a flow diagram of the rescheduling steps when there is meeting cancellation and the user now wants to attend a known but unscheduled meeting. As with the method of FIG. 2, the method is in a monitoring state in step 160. When there is a meeting postponement or cancellation, this scheduling change is detected in step 162. Next, in step 164, there is a determination of whether there are declined meetings that are going to still schedule to meet at that time slot. This option to attend a previously declined meeting is the result of the user deciding to track declined/unscheduled meetings from step 158 of FIG. 2. If there are no declined meetings that are still scheduled and available for the user to attend, this routine returns to the monitoring state in step 160. If there are declined meetings that are still available to attend, the user is notified in step 166 and prompted to decide whether they want to attend the declined but available meeting. If the user wants to attend a meeting, the meeting is scheduled in step 168. Step 170 then stores this meeting information and deletes the information of the postponed or canceled meeting. At this point, the routine returns to the monitoring state in step 160. Another approach can be to continue to track a postponed meeting if there is information about the new meeting time for that meeting.

Figure 4:
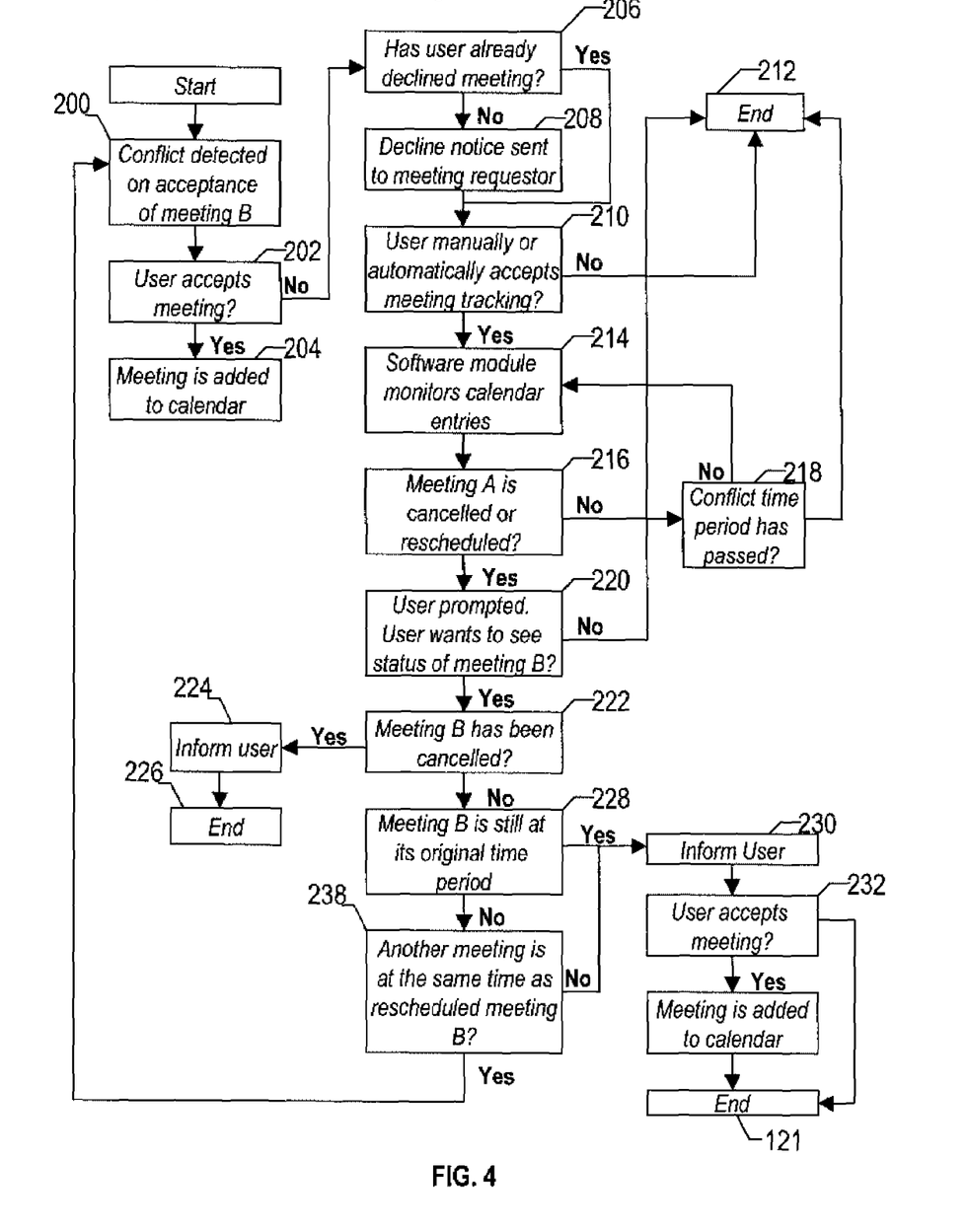
FIG. 4 is a detailed flow diagram of the steps in the implementation of the present invention.

FIG. 4 is a detailed flow diagram of the steps in the implementation of the present invention. The implementation of this method is described in an application of the scenario when a user receives a calendar invitation for meeting B, but the user has previously scheduled meeting A that same time slot (or overlapping time slot). In step 200 a conflict is detected when the user receives an invitation to meeting B. This conflict is the result of a check of the user's account, which would reveal a prior meeting already scheduled for that time slot. The user is notified of the meeting invitation. The user is also notified about the previously accepted meeting for that same time slot. In step 202, there is a determination of whether the user accepts the invitation to meeting B. If the user accepts the invitation to meeting B, in step 204 this meeting is added to the calendar in the time slot previously held by meeting A. If in step 202, the user declines the invitation to meeting B, then the method moves to step 206 where there a determination of whether the user has previously declined this meeting. If the user has not previously declined this meeting, the method moves to step 208 where a notice is sent to the meeting requestor informing the requestor of the user's decision to decline the meeting invitation. When the user has already declined the meeting, the method moves from step 206 to step 210 where there is a determination of whether the user wants to track the declined meeting. This tracking can be either manually tracked or automatically tracked. In this method, the user is prompted to determine whether or not to track the meeting and what form of tracking to use in the event the user does accept the meeting tracker. If the user chooses not to track the declined meeting, the method ends in step 212. The method can end with regard to this meeting conflict because the user has decided that it does not want to track the declined meeting. Returning to step 210, when the user decides to track the declined meeting, the method moves the step 214, which monitors the meeting schedule for the user. This monitoring process is the same as previously described in FIGS. 2 and 3.

During the monitoring cycle, in step 216, the user detects whether meeting A (the initially scheduled meeting) has been canceled or rescheduled. If there is no schedule change, then there is a determination of whether the conflict time between meetings has passed. This is necessary in the event the meeting times of meeting A and meeting B overlap, but may not be identical. The method of this invention only needs to monitor the declined meeting up to the earliest start time of meeting A or meeting B. For example, if both meeting A and meeting B started at 9:00 am and lasted until 10:00 am, then the software would need to monitor until 9:00 am. If meeting A went from 9:00 am to 10:00 am and meeting B went from 9:30 am to 10:30 am, the software would need to monitor until 9:00 am. If meeting A went from 9:00 am to 10:00 am and meeting B went from 8:30 am to 9:30 am, the software would need to monitor until 8:30 am.

Returning to step 216, when the determination is that meeting A has been rescheduled or canceled then the method moves to step 220 where the user is notified about the meeting change. The user is queried to determine if the user wants to know the status of meeting B (this is the meeting that was previously declined). If the user does not want to know the status of meeting B, then the process ends in box 212. The meeting status can be that meeting B still scheduled for its original time. When the user does want to know the status of meeting B, the process moves to step 222, where there is determination of whether meeting B has been canceled. If meeting B has been canceled, step 224 notifies and informs the user of the cancellation. At this point, the method ends at block 226. In step 222, if the determination is that meeting B has not been canceled, then the process moves to step 228. At this step, there is a determination if meeting B is still at its originally scheduled time. If the meeting time is still the original time, then step 230 informs the user. Now step 232 queries the user to determine whether the user wants to accept this meeting. If the user accepts the meeting B, then the meeting is added to the user's calendar. If in step 232, the user does not accept the meeting the method ends in block 236.

Referring back to step 228, if meeting B is not at its originally scheduled time, then the process moves to step 238 where there is a determination whether another meeting is scheduled at the same time as the rescheduled meeting B. If there is no other meeting scheduled for this time period, the method moves to step 230 and the process continues as described from step 230. If in step 238, the determination is that another meeting is at the same time as the rescheduled meeting B, then the process moves back to the beginning step 200 of the process and where there is a detection of the conflict between meetings.

Figure 5:
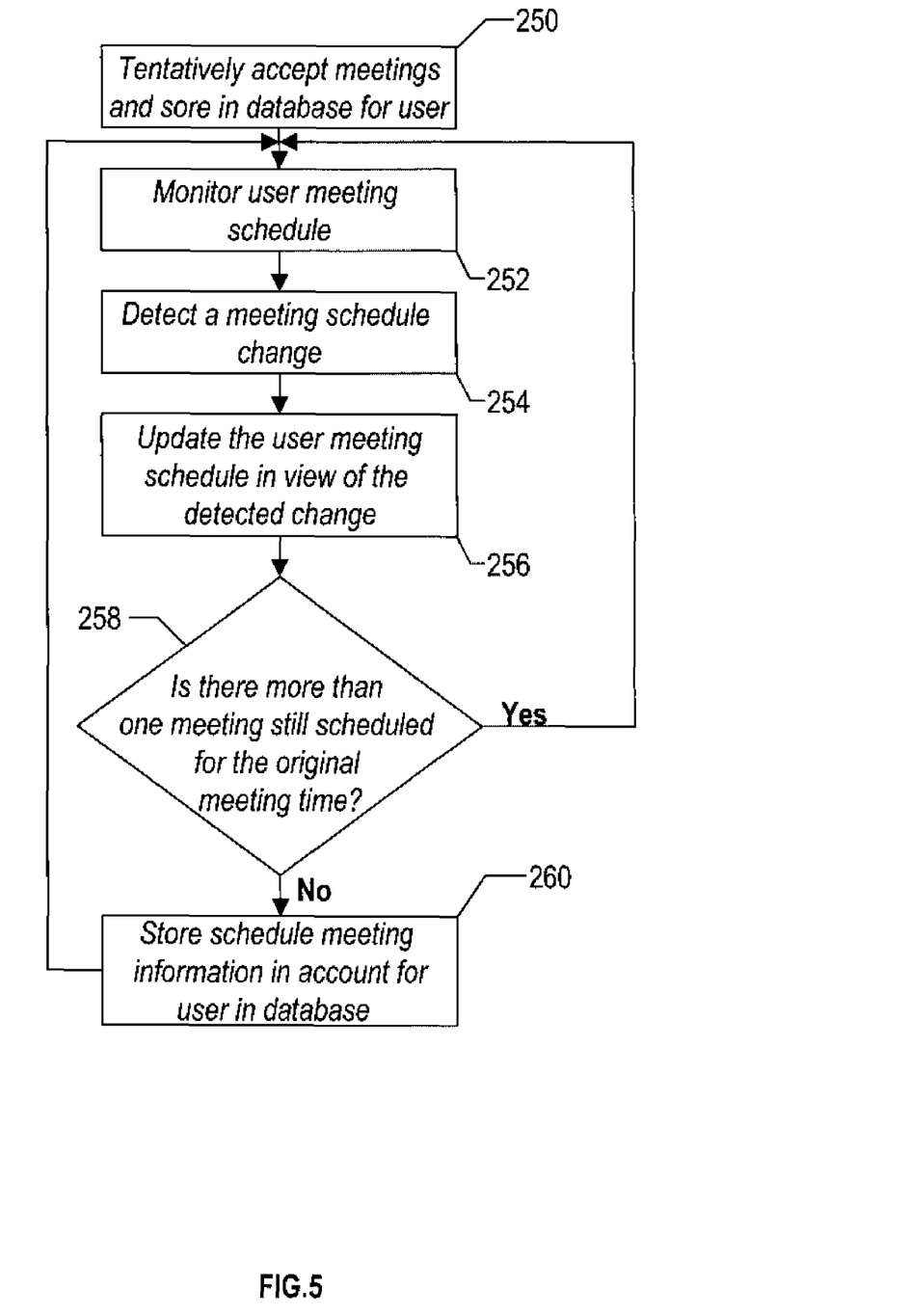
FIG. 5 is a detailed flow diagram of the steps in an alternate implementation of the present invention, which automatically notifies the user of a meeting confirmation when there has been a change in the user's meeting schedule.

FIG. 5 illustrates an alternate implementation of the present invention, which automatically notifies the user of a meeting confirmation when there has been a change in the user's meeting schedule. In this embodiment, the user tentatively accepts any meeting that conflicts with a previously scheduled meeting. The user can then choose to attend which meeting they would like. For example, if 2 (or more) meetings were tentatively accepted for overlapping time periods, step 250, the method of the invention could monitor and track the meetings step 252, such that if the other meetings were rescheduled, or canceled, the method would detect this change in step 254. After the schedule change is detected, the user's meeting schedule is updated in step 256 to include the new status of the meeting that was changes. The status change could be rescheduled (with the new time) or canceled. Next, in step 258, in view of the detected meeting changes, there is a determination of how many meetings are still scheduled for the specific original meeting time. If there are more than one meeting still scheduled for this original meeting time, the method returns to the monitoring step 252. If there is only one meeting that remains scheduled at the original time, the method moves to step 260 where the status of the remaining meeting changes to confirmed. The status of the one remaining meeting is automatically changed to "Confirmed". The method also automatically notifies the originator of the meeting that instead of having a "Tentative" status, the user would now have a "Confirmed" status (since there now would not be another meeting to choose from in the same time period). If at least two meetings are still tentatively scheduled at the time of the meeting, the user may select the meeting they want to attend or a default is to attend the first meeting that was scheduled.

Figure 6:
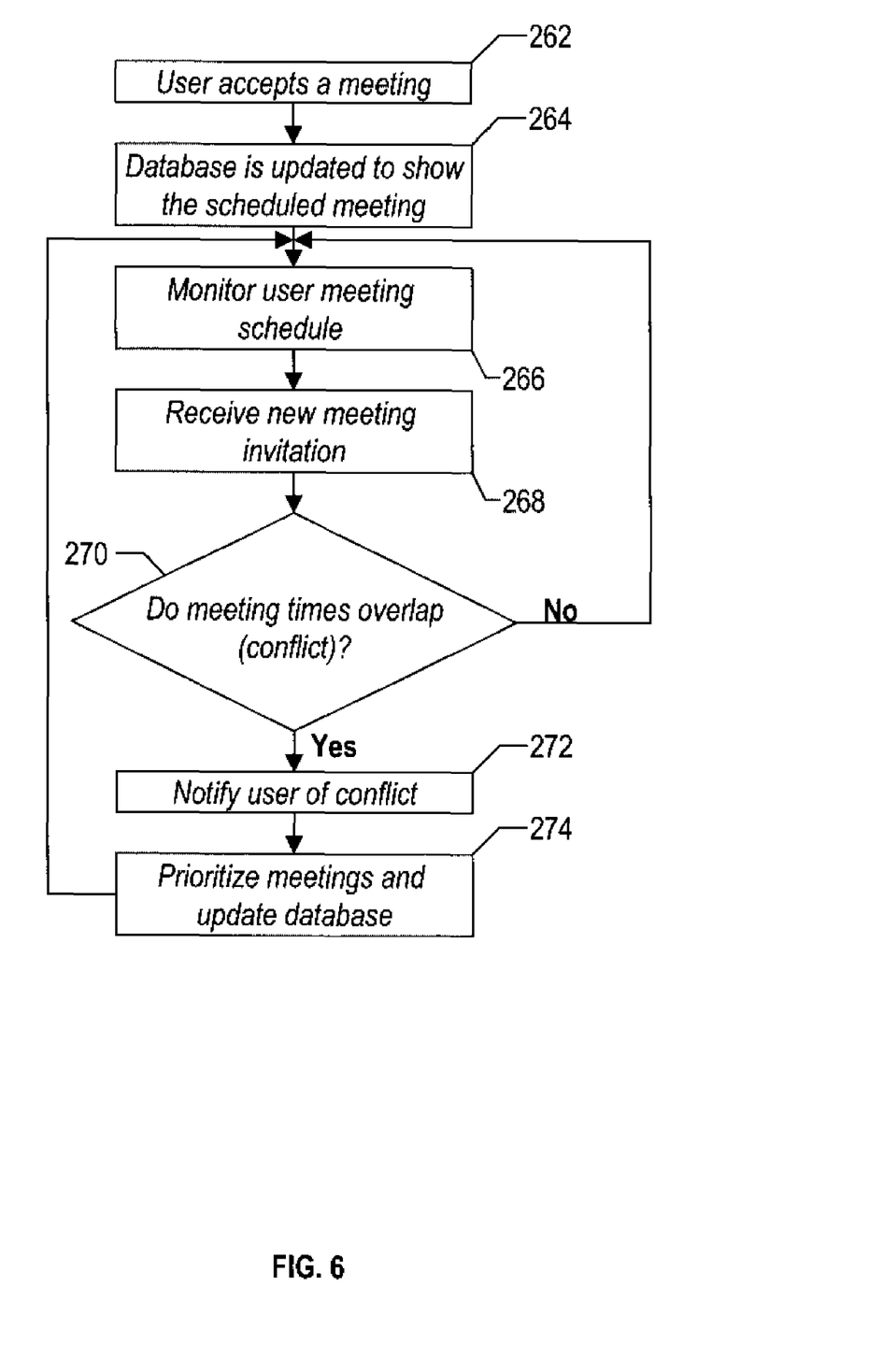
FIG. 6 is a detailed flow diagram of the steps in an alternate implementation of the present invention, which prioritizes conflicting meetings.

In an alternate embodiment, the user may receive any number of meeting invitations for an overlapping time period. FIG. 6 illustrates the method that applies to this situation. For example, consider the scenario where the user receives a meeting invitation A for next Wednesday from 9:00 am to 10:00 am, and accepts it. A short time later, he receives meeting B from 9:30 am to 10:30 am, then later receives meeting C from 9:45 am to 11:45 am and finally receives meeting D from 7:30 am to 9:30 am. Thus, it was suggested that in addition to having the meeting tracking functionality, we should also have an enhanced calendar user interface, such that the user can denote the priority of each meeting. This prioritization feature would work in the following the steps in FIG. 6 and using the 4-meeting scenario as an example. In step 262, the user receives meeting A, and accepts it, since currently there is no other meeting at that time and no conflict. After a meeting is accepted, step 264 updates the database to show the new meeting schedule. Step 266 monitors the user's meeting schedule. In step 268, the user receives meeting B. At this point, step 270 determines if the meeting times overlap and whether there is a conflict. If there is no conflict, then method returns to FIG. 266. If there is a conflict, step 272 notifies the user. Step 274 receives the prioritized meeting information and updates the database. In the prioritizing step 274, the user determines meeting B is more important, he designates meeting B as having priority 1 and meeting A as having priority 2 in the user interface (could be a drop-down box or other common text widget). This action thus replaces meeting A on the calendar with meeting B, sends an updated status to the originator of meeting A saying that instead of "Accepted", the user has now "Declined" the meeting, and the software automatically starts tracking meeting A. At this point, the method returns to the monitoring step 266. Next, the user receives meeting C in step 268 and determines B to be more important than C, but C to be more important than A, so denotes in the user interface that meeting B has priority 1, meeting C has priority 2, and meeting A has priority 3. No changes are necessary to the calendar. The user then receives meeting D in step 268, and sets the priority of meeting D to be 1, meeting B to be 2, meeting C to be 3 and meeting A to be 4, and notifications are sent, database updates are made, and meetings are tracked and monitored in step 266.

Having the priorities for the meeting defined means that now if meeting D is canceled or rescheduled, meeting B (since it was the next highest priority) is automatically added to the calendar, the status for the user for meeting B is now "Accepted" instead of "Declined", and the other meetings (meeting C and meeting A) are still tracked (in case something happens with meeting B, etc.). One additional point to note is that even though the user might have determined that meeting D has priority 1, meeting B is 2, meeting C is 3 and meeting A is 4, the user's manager may come in and tell the user they must attend meeting A, because of some critical issue, etc. Therefore, in addition to allowing the user to denote the priorities on receipt of new meetings, the user interface enhancement could also allow the user to manually override existing priorities at any time as necessary, so that meeting A is now priority 1, meeting D is 2, meeting B is 3, and meeting C is 4 (with the requisite updates and notifications automatically occurring).

The method of FIG. 6 can be enhanced to notify a meeting originator when certain key people cannot attend a scheduled meeting. If in step 274 a user made meeting B a priority over meeting A and the user's attendance is critical in meeting A, then the invention can alert the originator of meeting A that the user has declined to attend meeting A. At this point, the originator of meeting A may decide to reschedule meeting A to a time when the user can attend. For example, a person "John" may schedule a meeting and invite 7 people. However, of the 7 people, "Andrew" is a really key person and hence John cannot hold the meeting unless Andrew is present (some of the other invitees may be required, but not absolutely essential for them to attend, whereas Andrew is absolutely essential). Andrew has free space on his calendar, so he accepts. However, sometime later, Andrew receives a meeting invitation from "Barbara" for an overlapping time period, and Andrew determines Barbara's to be more important than John's meeting. Therefore, using the techniques of the invention, Andrew sets the priority of Barbara's meeting to be 1, Barbara's meeting replaces John's meeting on Andrew's calendar, a status update is sent to John from Andrew saying that he "Declines" the meeting, and the software for Andrew's calendar starts tracking John's meeting. However, since Andrew is a key person for John's meeting, the invention needs to be enhanced to recognize this, and automatically reschedule John's meeting to a time that Andrew (and the other invitees) can make it. Furthermore, if Barbara's meeting is canceled or rescheduled with a sufficient amount of notice (for example 2 or 3 days before John's meeting was originally scheduled for), then the invention can be enhanced to detect this, and schedule John's meeting back at its original time, since Andrew can now attend it (and since Andrew is a key person for John's meeting). The invention enhancements highlighted in this scenario are the following: 1) having the ability to denote key person(s) for a meeting when scheduling it. A key person is defined as a person whose attendance is mandatory for the meeting to proceed; 2) having the ability to monitor and track the calendar for key person(s), such that if something comes up later where they can't make it, the software notifies the originator, and automatically reschedules the meeting to a time where the key person(s) (and other invitees) can make it; 3) further monitoring and tracking the calendar for key person(s), such that if the conflicting meeting was rescheduled (with a sufficient amount of time—this amount can be defined by the meeting originator), then the meeting could be rescheduled again to its original time.

Figure 7:
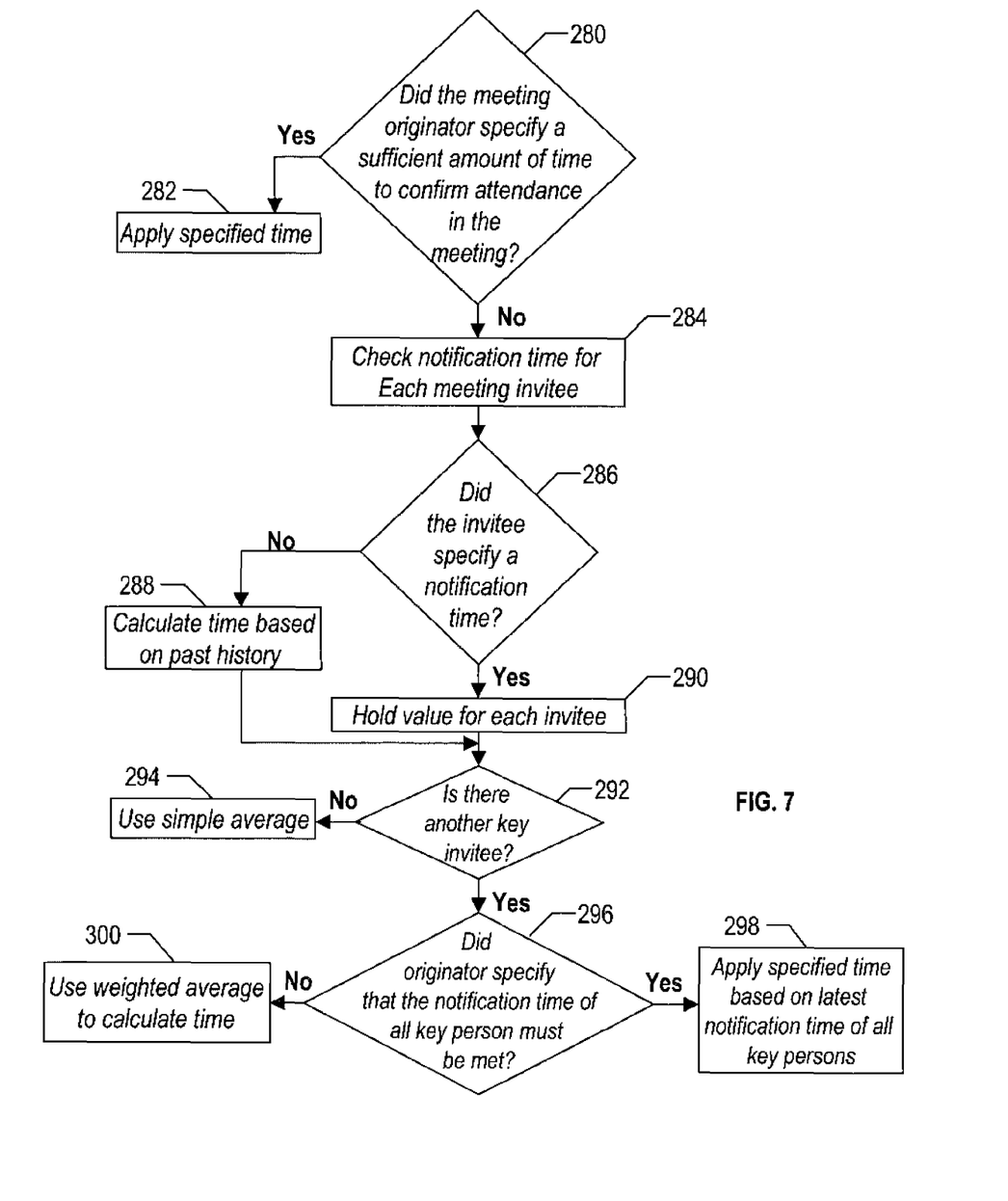
FIG. 7 is a flow diagram of the steps to determine a sufficient amount of time to reschedule a meeting to its originally scheduled meeting when a key invitee can attend the meeting.

FIG. 7 is a flow diagram that can determine whether the originator has a sufficient amount of time to reschedule a meeting when it is determined that a key person can now attend the meeting. In step 280, there is a determination of whether the meeting originator specified an amount of time for an invitee to confirm their attendance at a meeting. If the meeting originator did specify this sufficient amount of time, that time specification is the sufficient amount of time and is applied in step 282 to determine if there is sufficient time to reschedule the meeting. If the meeting originator did not specify a sufficient amount of time to confirm attendance, then the method moves to step 284 and checks the notification time for meeting invitee. As part of checking notification time for meeting invitee, there is a determination of whether a meeting invitee specified a notification time. If so, step 286 holds the notification time for that user in block 290. If the user did not specify a notification time, then step 288 can calculate a notification time based on past notification times for that user. For example, this calculation can be based on a sample time that can range from one month to possibly a year. The number of meetings an invitee attends can influence this range.

This method of determining sufficient time is based on the fact that a key meeting invitee (one key invitee whose attendance is critical the meeting) who could not previously attend the meeting can now attend the meeting. At this point, following the determination of the notification times for each invitee, there can be a determination of whether there is at least one other key invitee in step 292. If there is not another key invitee, then the method moves to step 294 where there is a determination of a notification time by simply averaging the notification times (from steps 288 and 290) of the invitees. If there is another key invitee, step 296 determines if the meeting originator specified whether the notification time of all key invitees must be met. If there is no specification that the notification times of all key invitees must be met, then step 300 will calculate the notification time based on a weighted average. This approach will give more weight to the times of the key invitees over the other invitees. The reason for this weighted average is to enable the key invitees to have more influence in this time calculation since there is attendance is more critical to conducting the meeting. If desired, the meeting originator can apply this concept of weighting the notification times to individual invitees that may not be key people. If in step 296, the originator did specify that the notification times of each key person must be met, then in step 298 applies the specified notification time based on the latest notification time of all key persons. For example, if there were two invitees and one invitee had a notification time of one day and the second key invitee had a notification time of two days, then the two-day time is the more restrictive time. Therefore, the sufficient time period would be two days. As a result of this method, there can be at least three ways to determine a sufficient amount of time to notify meeting invitees of a rescheduled meeting.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

We claim:

1. A method performed in a data processing system for a scenario in which conflicting calendar meeting entries are managed, said method comprising:

a computer of the data processing system monitoring one or more meeting entries in meetings scheduled for a particular user that are stored in a database, the database containing scheduling information comprising meeting time, date and location of each meeting;

said computer detecting a first new meeting entry of a newly detected meeting B for the particular user;

responsive to said detecting the first new meeting entry, said computer determining that there is a first scheduling conflict between the newly detected meeting B and a previously scheduled meeting A for the particular user stored in the database with respect to a first time period during which meeting A has been scheduled;

responsive to said determining that there is said first scheduling conflict, said computer notifying the particular user of the first scheduling conflict;

after said notifying the particular user of the first scheduling conflict, said computer receiving from the particular user an indication that meeting B has a higher priority than meeting A;

after said receiving the indication that meeting B has a higher priority than meeting A, said computer ascertaining whether (i) to replace meeting A by meeting B for the particular user in light of meeting B having said higher priority than meeting A or (ii) to decline meeting B for the particular user due to an overriding consideration communicated to the computer;

if said ascertaining ascertains to replace meeting A by meeting B, then said computer (i) sending a decline message to an originator of meeting A which informs the originator of meeting A that the particular user has declined meeting A, and (ii) initiating tracking of meeting A, thus meeting B is selected as a currently scheduled meeting while meeting A is a declined meeting;

if said ascertaining ascertains to decline meeting B, then said computer (i) sending a decline message to an originator of meeting B which informs the originator of meeting B that the particular user has declined meeting B and (ii) initiating tracking of meeting B, thus meeting A is selected as the currently scheduled meeting while meeting B is the declined meeting;

wherein meeting A or meeting B is selected in the scenario via said ascertaining to be the currently scheduled meeting while the unselected meeting of meeting B or meeting A, respectively, is the declined meeting, and wherein the method performed for the scenario further comprises:

said computer detecting a second new meeting entry of a newly detected meeting C for the particular user;

responsive to said detecting the second new meeting entry, said computer determining that there is a second scheduling conflict between the second newly detected meeting C and the declined meeting for the particular user stored in the database with respect to the first time period;

responsive to said determining that there is said second scheduling conflict, said computer notifying the particular user of the second scheduling conflict;

after said notifying the particular user of the second scheduling conflict, said computer receiving from the particular user an indication that the currently scheduled meeting has a higher priority than meeting C and that meeting C has a higher priority than the declined meeting;

responsive to said receiving from the particular user the indication that the currently scheduled meeting has a higher priority than meeting C and that meeting C has a higher priority than the declined meeting, said computer (i) declining meeting C for the user by informing the originator of meeting C that the particular user has declined meeting C and (ii) initiating tracking of meeting C;

after said informing the originator of meeting C that the particular user has declined meeting C and initiating tracking of meeting C, said computer detecting a third new meeting entry of a newly detected meeting D for the particular user;

responsive to said detecting the third new meeting entry, said computer determining that there is a third scheduling conflict between the third newly detected meeting D and the declined meetings for the particular user stored in the database with respect to the first time period;

responsive to said determining that there is said third scheduling conflict, said computer notifying the particular user of the third scheduling conflict;

after said notifying the particular user of the third scheduling conflict, said computer receiving from the particular user an indication that meeting D has a higher priority than the currently scheduled meeting; and responsive to said receiving from the particular user the indication that meeting D has a higher priority than the currently scheduled meeting, said computer (i) declining the currently scheduled meeting for the user by informing the originator of the currently scheduled meeting that the particular user has declined the currently scheduled meeting and (ii) initiating tracking of the newly declined currently scheduled meeting.

2. The method of claim 1, wherein ascertaining ascertains to replace meeting A by meeting B.

3. The method of claim 2, wherein the particular user's presence at meeting A is required such that meeting A cannot be held unless the particular user attends meeting A, and wherein the method further comprises:

said computer receiving a message from the originator of meeting A that meeting A has been rescheduled to a second time period when the particular user can attend meeting A due to the particular user's presence at meeting A being required.

4. The method of claim 2, wherein the method further comprises:

after meeting A has been rescheduled to the second time period, said computer receiving notification that meeting B has been rescheduled to a third time period that does not conflict with the first time period; and after said receiving notification that meeting B has been rescheduled to the third time period, said computer rescheduling meeting A to the first time period.

5. The method of claim 1, wherein ascertaining ascertains to decline meeting B.

6. The method of claim 5, wherein the overriding consideration is that the particular user's presence at meeting A is required such that meeting A cannot be held unless the particular user attends meeting A.

7. The method of claim 5, wherein the overriding consideration is that the particular user's manager has indicated that the particular user must attend meeting A.

* * * * *